United States Patent
Umesh et al.

(10) Patent No.: US 7,885,652 B2
(45) Date of Patent: Feb. 8, 2011

(54) MOBILE STATION, MOBILE COMMUNICATION SYSTEM, AND MOBILE COMMUNICATION METHOD

(75) Inventors: Anil Umesh, Yokohama (JP); Masafumi Usuda, Yokosuka (JP); Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 245 days.

(21) Appl. No.: 11/376,220

(22) Filed: Mar. 16, 2006

(65) Prior Publication Data

US 2006/0252452 A1    Nov. 9, 2006

(30) Foreign Application Priority Data

Mar. 16, 2005    (JP)    ............................ P2005-076072

(51) Int. Cl.
 *H04W 24/00*    (2009.01)
(52) U.S. Cl. ........................ 455/425; 455/423
(58) Field of Classification Search .......... 455/423–425
 See application file for complete search history.

(56) References Cited

U.S. PATENT DOCUMENTS

| 2003/0152031 A1 | 8/2003 | Toskala et al. | |
|---|---|---|---|
| 2003/0202500 A1* | 10/2003 | Ha et al. | 370/342 |
| 2004/0192308 A1 | 9/2004 | Lee et al. | |
| 2005/0180328 A1* | 8/2005 | Kim et al. | 370/236 |

FOREIGN PATENT DOCUMENTS

| EP | 1251661 B1 | 8/2008 |
|---|---|---|
| EP | 1357695 B1 | 7/2009 |
| WO | WO 2005/065062 A2 | 7/2005 |

OTHER PUBLICATIONS

3GPP TS 25.309 V6.1.0 (Dec. 2004)' 3rd Generation Partnership Project; Technical Specification Group Radio Access Netwok;FDD Enhanced Uplink;Overall description' Stage2;pp. 1-26.

3GPP TR 25.808 V1.0.1 (Feb. 2005)' 3rd Generation Partnership Project; Technical Specification Group Radio Access Network; FDD Enhanced Uplink; Physical Layer Aspects; pp. 1-26.

3GPP TS 25.101 V6.9.0 (Sep. 2005)' 3rd Generation Partnership Project; Technical Specification Group Radio Access Network; User Equipment (UE) radio transmission and (Cont.) reception (FDD); pp. 76-79.

(Continued)

*Primary Examiner*—Lester Kincaid
*Assistant Examiner*—Steven Lim
(74) *Attorney, Agent, or Firm*—Marvin A. Motsenbocker; Mots Law, PLLC

(57) ABSTRACT

A mobile station includes; a retransmission control section configured to perform retransmission control of user data in a physical layer and a MAC sublayer with one or more radio base stations; and a threshold setting section configured to set a threshold used for determining presence or absence of an acknowledgement signal of the user data, according to the number of the radio base stations to which the mobile station connects.

6 Claims, 5 Drawing Sheets

OTHER PUBLICATIONS

3GPP TSG-RAN4 Meeting #34; T-doc R4-050286; LS on Performance Targets for HSUPA Signalling Channels; High Speed Uplink Packet Access; Phoenix, AZ, USA Feb. 14-18, 2005.

3GPP TSG-RAN WG1 Meeting #40bis; R1-050374; Reply LS on Performance Targets for HSUPA Signalling Channels; FDD Enhanced Uplink; Beijing, China, Apr. 4-8, 2005, pp. 1-2.

LG Electronics, "ACK/NACK signaling performance for E-DCH in soft handover", 3GPP TSG RAN WG1 R6 Adhoc, R1-040023, Espoo, Finland, Jan. 27-30, 2004, 8 pages.

Philips, "HARQ in SHO for Enhanced Uplink", 3GPP TSG RAN WG2 WG2 #44, R2-042155, Sophia Antipolis, France, Oct. 4-8, 2004, 2 pages.

* cited by examiner

MOBILE STATION, MOBILE COMMUNICATION SYSTEM, AND MOBILE COMMUNICATION METHOD

CROSS REFERENCE TO RELATED APPLICATION

This application is based upon and claims the benefit of priority from the prior Japanese Patent Application No. P2005-076072, filed on Mar. 16, 2005; the entire contents of which are incorporated herein by reference.

BACKGROUND OF THE INVENTION

1. Field of the Invention

The present invention relates to mobile stations, mobile communication systems and mobile communication methods.

2. Description of the Related Art

The Radio Access Network Working Groups (RAN WGs) in the $3^{rd}$ Generation Partnership Project (3GPP), an international standards body for third-generation mobile communication systems, have been formulating detailed specifications for a standard adopting the Wideband Code Divisional Multiple Access (W-CDMA) as a multiple access scheme of radio access.

Consequently, basic specifications have been completed in Release 99 so far. Also, specifications for the High Speed Downlink Packet Access (HSDPA) for improving efficiency of downlink packet-switched data transmission have been completed in Release 5 specifications. In addition, specifications for the Enhanced UpLink (EUL) for improving efficiency of uplink packet-switched data transmission are currently in the works to be included in Release 6 specifications.

In the EUL specifications, adoption of the Hybrid Automatic Repeat reQuest (HARQ) retransmission, which has been adopted in HSDPA, has been determined.

The HARQ retransmission is a scheme in which high-speed user data retransmission control is performed between a mobile station and a radio base station in the physical layer and the Medium Access Control (MAC) sublayer.

Here, the radio base station corresponds to a function (i.e., cell) for control radio communications with mobile stations located in a specific area. At least one radio base stations can be included in one radio base station apparatus.

In Release 99, the Radio Link Control (RLC) retransmission, which is performed in the RLC sublayer between a mobile station and a radio network controller, is adopted as a retransmission control scheme.

Introduction of the HARQ retransmission is expected to reduce delay caused by retransmission, improving radio transmission efficiency.

However, even when the HARQ retransmission is introduced, it is necessary to cover what the HARQ retransmission cannot handle by the RLC retransmission.

For example, in the HSDPA, which has already adopted the HARQ retransmission, control signal error in the HARQ retransmission is covered by the RLC retransmission.

In addition, the RLC retransmission caused by the control signal error is reduced to a desired probability by controlling transmission power of a High Speed Shared Control CHannel (HS-SCCH) and a threshold used for determining the presence or absence of an acknowledgement signal, in order to reduce delay caused by retransmission.

In the EUL, however, unlike in the HSDPA, diversity handover is employed. Therefore, the same control as in the HSDPA can cause frequent occurrence of the RLC retransmission. Consequently, delay caused by retransmission cannot be reduced, leading to deterioration in radio transmission efficiency.

BRIEF SUMMARY OF THE INVENTION

The present invention has been made considering the problems, and its object is to reduce delay caused by retransmission, and to improve radio transmission efficiency even when diversity handover is employed.

A first aspect of the present invention is summarized as a mobile station including: a retransmission control section configured to perform retransmission control of user data in a physical layer and a MAC sublayer with one or more radio base stations; and a threshold setting section configured to set a threshold used for determining presence or absence of an acknowledgement signal of the user data, according to the number of the radio base stations to which the mobile station connects.

In the first aspect, the threshold setting section can be configured to set the threshold so that a probability of determining that the acknowledgement signal has been transmitted when the acknowledgement signal has not been transmitted when the mobile station connects to a plurality of radio base stations is lower than the probability when the mobile station connects to one radio base station.

In the first aspect, the threshold setting section can be configured to set the threshold, based on transmission power of a radio physical control channel.

In the first aspect, the retransmission control section can be configured to perform the retransmission control by a hybrid automatic repeat request scheme.

In the first aspect, the user data can be transmitted by enhanced uplink.

A second aspect of the present invention is summarized as a mobile communication system in which user data is transmitted and received between a mobile station and one or more radio base stations, including: the mobile station including: a retransmission control section configured to perform retransmission control of the user data in a physical layer and a MAC sublayer with the radio base stations; and a threshold setting section configured to set a threshold used for determining presence or absence of an acknowledgement signal of the user data, according to the number of the radio base stations to which the mobile station connects.

A third aspect of the present invention is summarized as a mobile communication method including: performing retransmission control of user data in a physical layer and a MAC sublayer between a mobile station and one or more radio base stations; and setting a threshold used for determining presence or absence of an acknowledgement signal of the user data, according to the number of the radio base stations to which the mobile station connects.

DETAILED DESCRIPTION OF THE INVENTION

Figure 1:
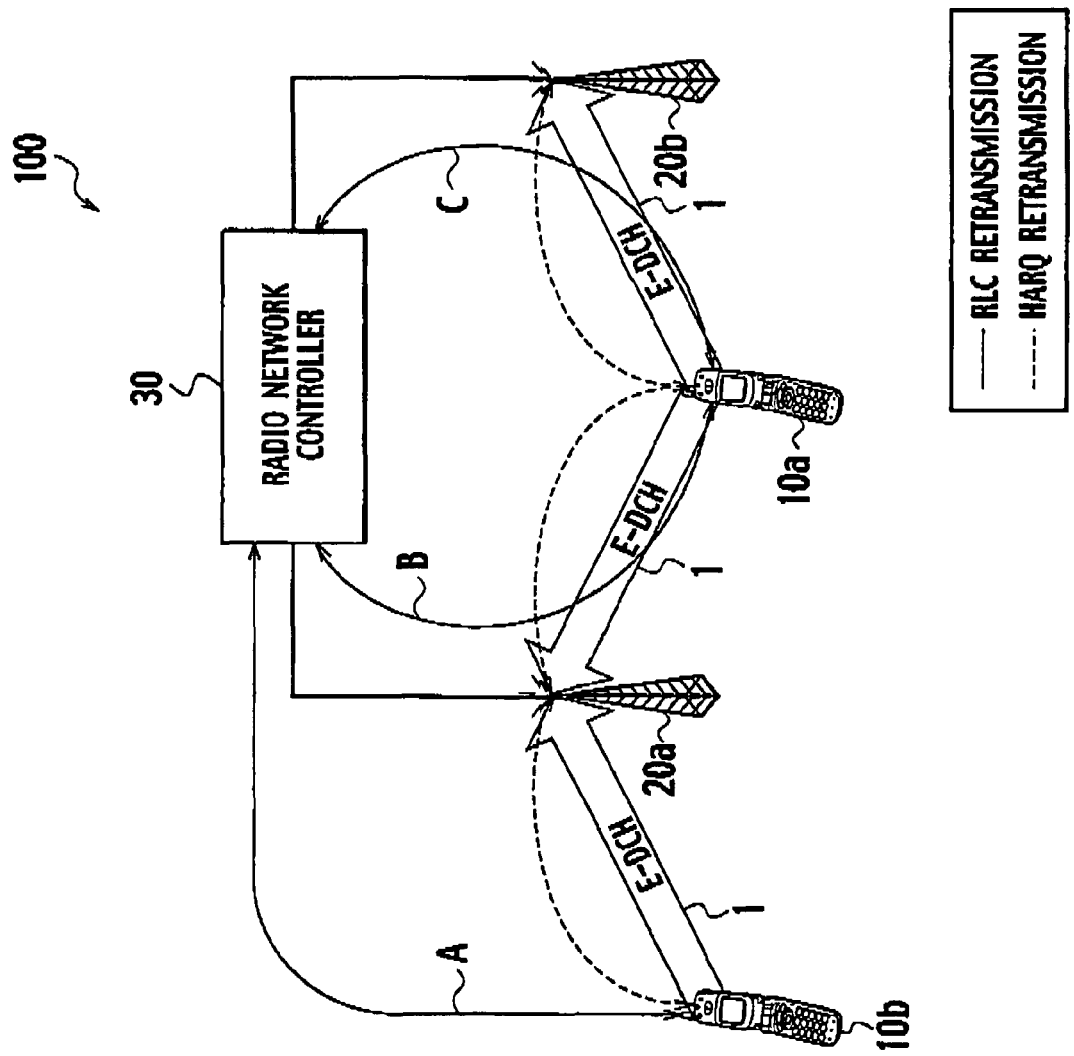
FIG. 1 is a diagram showing the configuration of a mobile communication system according to an embodiment of the present invention.

As shown in FIG. 1, a mobile communication system 100 includes mobile stations (UEs: User Equipments) 10a and 10b, radio base stations (Node Bs) 20a and 20b, and a radio network controller (RNC: Radio Network Controller) 30.

In the mobile communication system 100, The Enhanced UpLink (hereinafter referred to as "EUL") is used for uplink transmission of user data from the mobile stations 10a and 10b to the radio base stations 20a and 20b.

Accordingly, the mobile stations 10a and 10b map user data to an Enhanced Dedicated CHannel (hereinafter referred to as an "E-DCH") according to the EUL for transmission to the radio base stations 20a and 20b.

In the mobile communication system 100, the High Speed Downlink Packet Access (hereinafter referred to as "HSDPA") is used for downlink transmission of user data from the radio base stations 20a and 20b to the mobile stations 10a and 10b.

Also, in the mobile communication system 100, retransmission of user data is performed using the Hybrid Automatic Repeat reQuest (hereinafter referred to as "HARQ") retransmission according to a HARQ scheme, and Radio Link Control (RLC) retransmission.

The HARQ retransmission is retransmission control performed in the physical layer (layer 1) and the MAC sublayer between the mobile stations 10a and 10b and the radio base stations 20a and 20b as shown by dashed lines.

The RLC retransmission is retransmission control performed in the RLC sublayer between the mobile stations 10a and 10b and the radio network controller 30 via the radio base stations 20a and 20b, as shown by solid lines A to C.

Therefore, the HARQ retransmission enables much faster retransmission control than the RLC retransmission.

Also, in the mobile communication system 100, diversity handover is employed.

Specifically, for example, as in the case of the mobile station 10b, when the quality of a radio link to the radio base station 20a is higher than that of a radio link to another radio base station, the mobile station 10b connects only to the radio base station 20a of the highest radio link quality.

That is, the mobile station 10b establishes an E-DCH 1 only with the radio base station 20a, and transmits user data only to the radio base station 20a. Then, only the radio base station 20a receives the user data from the mobile station 10b.

On the other hand, as in the case of the mobile station 10a, when radio links to the radio base stations 20a and 20b have equal quality, the mobile station 10a connects to the radio base stations 20a and 20b.

That is, the mobile station 10a establishes E-DCHs 1 with the radio base stations 20a and 20b, and performs the diversity handover, transmitting user data to the radio base stations 20a and 20b. Then, both the radio base stations 20a and 20b receive the user data from the mobile station 10a.

Next, a mobile communication method performed in the mobile communication system 100, including the RLC retransmission, the HARQ retransmission, and transmission and reception of user data according to the EUL and the HSDPA will be described in detail. This will be described below as an interaction between a transmitting end and a receiving end.

In the downlink, the radio network controller 30 performs processing in the RLC sublayer and part of processing in the MAC sublayer of a transmitting end, and the radio base stations 20a and 20b perform part of processing in the MAC sublayer and processing in the physical layer.

The mobile stations 10a and 10b perform processing in the RLC sublayer, the MAC sublayer and the physical layer of a receiving end.

In the uplink, the mobile stations 10a and 10b perform processing in the RLC sublayer, the MAC sublayer and the physical layer of a transmitting end.

The radio network controller 30 performs processing in the RLC sublayer and part of processing in the MAC sublayer of a receiving end, and the radio base stations 20a and 20b perform part of processing in the MAC sublayer and processing in the physical layer.

Specifically, in the MAC sublayer, processing for the HSDPA in downlink ends in the MAC-hs. Therefore, the radio base stations 20a and 20b perform processing in the MAC-hs of the transmitting end, and the mobile stations 10a and 10b perform processing in the MAC-hs of the receiving end.

Also, in the MAC sublayer, processing for the EUL in uplink ends in the MAC-e. Therefore, the mobile stations 10a and 10b perform processing in the MAC-e of the transmitting end, and the radio base stations 20a and 20b perform processing in the MAC-e of the receiving end.

The transmitting end processes user data generated by an upper application in the Radio Link Control (RLC) sublayer, the Medium Access Control (MAC) sublayer and the physical layer in this order.

Then, the transmitting end transmits the user data to the receiving end by a radio physical data channel. The receiving end processes received signals on the radio physical data channel in the physical layer, the MAC sublayer and the RLC sublayer in this order. Then, the receiving end provides the reconstructed user data to an upper application.

Specifically, the transmitting end divides user data generated by an upper application into RLC data Protocol Data Units (PDUs) of a given size in the RLC sublayer.

The transmitting end adds a sequence number to each divided RLC data PDU for provision to the MAC sublayer.

At that time, the transmitting end stores the RLC data PDUs in a buffer so that when a RLC data PDU is lost in a radio zone to the receiving end, the lost RLC data PDU can be retransmitted.

Next, the transmitting end sorts the RLC data FDUs provided from the RLC sublayer into certain transport channels in the MAC sublayer.

In the HSDPA, a transport channel used for downlink transmission of user data is a High Speed Downlink Shared CHannel (HS-DSCH).

In the EUL, a transport channel used for uplink transmission of user data is an E-DCH 1.

The transmitting end joins a plurality of RLC data PDUs sorted into the HS-DSCH or E-DCH 1 together to generate one Transport Block (TB).

The number of RLC data PDUs included in one TB depends on radio resources allocated to the mobile stations 10a and 10b at that moment by schedulers of the radio base stations 20a and 20b.

The transmitting end provides one TB per Transmission Time Interval (TTI) to the physical layer. At that time, the transmitting end stores each TB in the buffer so that when a TB is lost in a radio zone to the receiving end, the lost TB can be retransmitted.

"TTI" is a minimum section of time in which to transmit user data. Specifically, it is a section of time in which to process and transmit a batch of user data in the physical layer. The possible TTI length depends on the type of a transport channel. It is specified that the TTI length of HS-DSCH is 2 ms, and the TTI length of E-DCH is 2 ms or 10 ms.

The transmitting end performs coding processing and spreading processing on a TB provided at each TTI from the MAC sublayer in the physical layer.

The transmitting end maps the processed user data to a radio physical data channel for transmission.

At that time, the coding rate, the spreading rate and the spreading code vary, depending on the TB size (the number of RLC data PDUs included in the TB).

Therefore, the transmitting end transmits information on the used TB size (hereinafter referred to as "TB size information") by a radio physical control channel, in parallel with the user data.

In the HSDPA, a radio physical data channel used for downlink transmission of user data is a High Speed Physical Downlink Shared CHannel (HS-PDSCH).

In the EUL, a radio physical data channel used for uplink transmission of user data is an E-DCH Dedicated Physical Data CHannel (E-DPDCH).

Also, in the HSDPA, a radio physical control channel used for transmission of TB size information is a High Speed Shared Control CHannel (HS-SCCH).

In the EUL, a radio physical control channel used for transmission of TB size information is an E-DCH Dedicated Physical Control CHannel (E-DPCCH).

The receiving end first receives a radio physical control channel (HS-SCCH or E-DPCCH) in the physical layer, and extracts TB size information from the transmitting end.

The receiving end despreads a signal on a radio physical data channel (HS-PDSCH or E-DPDCH), based on the extracted TB size information, and decodes a TB at each TTI. At that time, the receiving end stores a received signal before TB decoding, in a buffer.

Then, the receiving end performs error detection for each TB. The receiving end communicates acknowledgement information on user data to the transmitting end, based on a result of error detection.

Specifically, the receiving end transmits an acknowledgement signal (HARQ-Ack: HARQ Acknowledgement) in the physical layer to the physical layer of the transmitting end.

The receiving end provides a TB which is judged to have been decoded properly, to the MAC sublayer, and discards the received signal before TB decoding corresponding to the properly decoded TB, stored in the buffer.

In the HSDPA, a radio physical control channel used for transmission of an acknowledgement signal (HARQ-Ack) is a High Speed Dedicated Physical Control CHannel (HS-DPCCH).

In the EUL, a radio physical control channel used for transmission of an acknowledgement signal (HARQ-Ack) is an E-DCH HARQ Indicator CHannel (E-HICH).

The transmitting end performs retransmission, based on an acknowledgement signal (HARQ-Ack) in the physical layer from the receiving end.

Specifically, the transmitting end distinguishes a TB which has properly reached the receiving end from a TB which has not properly reached the receiving end, based on acknowledgement signals (HARQ-Ack).

The transmitting end discards, in the MAC sublayer, a TB stored in the buffer corresponding to a TB which has properly reached the receiving end.

The transmitting end retransmits, in the MAC sublayer, a TB stored in the buffer corresponding to a TB which has not properly reached the receiving end.

When a TB is retransmitted from the MAC sublayer of the transmitting end, the receiving end adds in power a received signal after despreading of a signal on the radio physical data channel (HS-PDSCH or E-DPDCH) to a received signal before TB-decoding received previously and stored in the buffer, in the physical layer, to try to decode the TB again. In this manner, the HARQ retransmission is performed.

The HARQ retransmission is repeated until the receiving end can receive a TB properly, or a predetermined maximum retransmission number of the HARQ retransmissions is reached.

When the receiving end cannot decode a TB properly even when the maximum retransmission number of the HARQ retransmissions is reached, the RLC retransmission is employed for RLC data PDUs included in the TB.

The receiving end sorts TBs provided from the physical layer into certain transport channels in the MAC sublayer. The receiving end extracts RLC data PDUs from each TB for provision to the RLC sublayer.

The receiving end stores each RLC data PDU provided from the MAC sublayer in the buffer in the RLC sublayer.

The receiving end checks the sequence number of a RLC data PDU and communicates acknowledgement information of user data to the transmitting end based on the result.

Specifically, the receiving end transmits a RLC control PDU including acknowledgement information to the RLC sublayer of the transmitting end.

Based on acknowledgement information in the RLC sublayer from the receiving end, the transmitting end performs retransmission.

Specifically, the transmitting end distinguishes a RLC data PDU which has properly reached the receiving end from a RLC data PDU which has been lost in the radio zone.

The transmitting end discards a RLC data PDU stored in the buffer corresponding to a RLC data PDU which has properly reached.

The transmitting end retransmits a RLC data PDU stored in the buffer corresponding to a RLC data PDU which has been lost in the radio zone. In this manner, RLC retransmission is performed.

When there is no missing sequence number in the RLC sublayer, the receiving end collects received RLC data PDUs to reconstruct user data, and provides the reconstructed user data to an upper application.

In the mobile communication system 100, the HSDPA and the EUL employing the HARQ retransmission as described above are used, whereby retransmission control can be performed in the physical layer and the MAC sublayer between the mobile stations 10a and 10b and the radio base stations 20a and 20b.

Consequently, in the mobile communication system 100, delay caused by retransmission can be much more reduced than when every retransmission is performed by the RLC retransmission performed between the mobile stations 10a and 10b and the radio network controller 30.

Specifically, only by the RLC retransmission, there arises delay of the order of hundreds of milliseconds, while by the use of the HARQ retransmission, delay can be reduced to the order of tens of milliseconds.

As described above, for retransmission of user data, the use of the HARQ retransmission can reduce delay more considerably than the use of the RLC retransmission, substantially improving radio transmission efficiency.

Therefore, in the mobile communication system 100, every retransmission control is basically handled by the HARQ, retransmission.

However, control signal error in the HARQ retransmission causes what the HARQ retransmission cannot handle. Therefore, in the mobile communication system 100, control signal error in the HARQ retransmission is handled by the RLC retransmission.

Specifically, in the HSDPA, when both a HS-SCCH detection error and an error in determining the presence or absence of an acknowledgement signal (HARQ-Ack) occur, or in the EUL, when both an E-DPCCH detection error and an error in determining the presence or absence of an acknowledgement signal (HARQ-Ack) occur, the RLC retransmission occurs.

Cases where the RLC retransmission occurs will be described in detail below.

As described above, in the HSOPA or the EUL, a receiving end first receives an HS-SCCH or an E-DPCCH when receiving a TB including user data transmitted by an HS-PDSCH or an E-DPDCH from a transmitting end, and extracts TB size information.

The receiving end identifies the coding rate, spreading rate and spreading code used in the HS-PDSCH or the E-DPDCH from the extracted TB size information. Then, the receiving end decodes the TB transmitted by the HS-PDSCH or the E-DPDCH.

At that time, the receiving end first determines whether the HS-SCCH or the E-DPCCH has been transmitted or not.

When it is determined that the HS-SCCH or the E-DPCCH has been transmitted, the receiving end determines that the HS-PDSCH or the E-DPDCH has also been transmitted, and starts processing for TB decoding.

Then, based on a result of TB error detection, when the TB is properly decoded, the receiving end transmits an Acknowledgement (Ack) as an acknowledgement signal (HARQ-Ack) to the transmitting end.

When the TB is not properly decoded, the receiving end transmits a Negative acknowledgement (Nack) as an acknowledgement signal (HARQ-Ack) to the transmitting end.

On the other hand, when it is first determined that the HS-SCCH or the E-DPCCH has not been transmitted, the receiving end determines that the HS-PDSCH or the E-DPDCH has also not been transmitted, and does not try TB-decoding.

Also, the receiving end determines an acknowledgement signal (HARQ-Ack) as Discontinuous Transmission (DTX). Here, the DTX means no signal transmission.

In this process sequence, the receiving end may erroneously determine that the HS-SCCH or the E-DPCCH has not been transmitted, although the transmitting end has transmitted the HS-SCCH or the E-DPCCH (hereinafter referred to as "HS-SCCH detection error" or "E-DPCCH detection error").

Also, the transmitting end may erroneously receive an acknowledgement signal (HARQ-Ack) as "Ack" when the receiving end determines the acknowledgement signal (HARQ-Ack) as "DTX" (hereinafter referred to as "Ack false detection").

That is, an error in determining the presence or absence of an acknowledgement signal (HARQ-Ack) may occur, in which the transmitting end recognizes that "Ack" has been transmitted from the receiving end, although no acknowledgement signal (HARQ-Ack) has been transmitted from the receiving end.

When both the "HS-SCCH detection error" or the "E-DPCCH detection error" and the "Ack false detection" occur, the transmitting end has the mistaken idea that the receiving end has been able to decode a TB properly. Therefore, the HARQ retransmission is not performed.

Consequently, this TB cannot be handled by the HARQ retransmission but is handled by the RLC retransmission, resulting in occurrence of the RLC retransmission.

Hereinafter, the occurrence of both the "HS-SCCH detection error" and the "Ack false detection" is referred to as "HS-SCCH detection error-Ack false detection", and the occurrence of both the "E-DPCCH detection error" and the "Ack false detection" is referred to as "E-DPCCH detection error-Ack false detection".

The rate of occurrence of the RLC retransmission due to the "HS-SCCH detection error-Ack false detection" (hereinafter referred to as the "RLC retransmission frequency") is the product of the rate of occurrence of the HS-SCCH detection error (hereinafter referred to as the "HS-SCCH detection error rate") and the rate of occurrence of the Ack false detection (hereinafter referred to as the "Ack false detection rate").

The RLC retransmission frequency due to the "E-DPCCH detection error-Ack false detection" is the product of the rate of occurrence of the E-DPCCH detection error (hereinafter referred to as the "E-DPCCH detection error rate") and the Ack false detection rate.

The Ack false detection rate is the probability that it is determined in DTX where no acknowledgement signal (HARQ-Ack) is transmitted, that "Ack" as an acknowledgement signal (HARQ-Ack) has been transmitted.

For downlink transmission of user data, the radio base stations 20a and 20b set transmission power of the HS-SCCH so that the HS-SCCH detection error rate is 1%, for example.

Also, the radio base stations 20a and 20b set a threshold used for determining the presence or absence of an acknowledgement signal (HARQ-Ack) of user data, that is, a threshold for determining whether a receiving end has transmitted "Ack" or determined DTX (hereinafter referred to as the "Ack-DTX determination threshold") so that the Ack false detection rate is 1%, for example.

With this, the RLC retransmission frequency due the "HS-SCCH detection error-Ack false detection" can be reduced to 0.01%.

The "Ack-DTX determination threshold" is a received power value by which to determine "Ack" when received power is greater than or equal to the threshold, and determine DTX when received power is smaller than the threshold.

Uplink transmission of user data will be described in detail with reference to FIGS. 2 to 4.

First, with reference to FIG. 2, a case where the mobile station 10a connects only to the radio base station 20b will be described.

The mobile station 10a maps user data to the E-DCH 1 for transmission to the radio base station 20b.

Specifically, the mobile station 10a maps user data included in the E-DCH 1 to an E-DPDCH 3 for transmission to the radio base station 20b.

Then, the radio base station 20b receives the E-DPDCH 3 from the mobile station 10a.

At that time, the mobile station 10a maps TB size information to an E-DPCCH 4 for transmission with the transmission of the E-DPDCH 3.

The radio base station 20b receives the user data transmitted by the E-DPDCH 3 from the mobile station 10a.

The radio base station 20b transmits an acknowledgement signal in the physical layer, a HARQ-Ack 2, for each received TB to the mobile station 10a.

The mobile station 10a sets transmission power of the E-DPCCH so that the E-DPCCH detection error rate is 1%, for example.

Also, the mobile station 10a sets a threshold used for determining the presence or absence of an acknowledgement signal (HARQ-Ack) of user data, that is, the Ack-DTX determination threshold by which to determine whether the radio base station 20b has transmitted "Ack" or determined DTX so that the Ack false detection rate is 1%, for example.

With this, the RLC retransmission frequency due to the "E-DPCCH detection error-Ack false detection" can be reduced to 0.01%.

Next, with reference to FIGS. 3 and 4, a case where the mobile station 10a connects to the radio base stations 20a and 20b (is in diversity handover) will be described.

The mobile station 10a maps user data to the E-DCHs 1 for transmission to the radio base stations 20a and 20b.

Specifically, the mobile station 10a maps the user data to the E-DPDCHs 3a and 3b for transmission to the radio base stations 20a and 20b, respectively.

The radio base stations 20a and 20b receive the E-DPDCHs 3a and 3b from the mobile station 10a, respectively.

At that time, the mobile station 10a maps TB size information to the E-DPCCHs 4a and 4b for transmission with the transmission of the E-DPDCHs 3a and 3b.

The radio base stations 20a and 20b receive the user data transmitted by the E-DPDCHs 3a and 3b from the mobile station 10a, respectively.

The radio base stations 20a and 20b independently try to decode a TB received by the E-DPDCHs 3a and 3b, respectively, and perform error detection.

The radio base station 20a transmits a HARQ-Ack 2a to the mobile station 10a, based on a result of its error detection. The radio base station 20b also transmits a HARQ-Ack 2b to the mobile station 10a, based on a result of its error detection.

Figure 3:
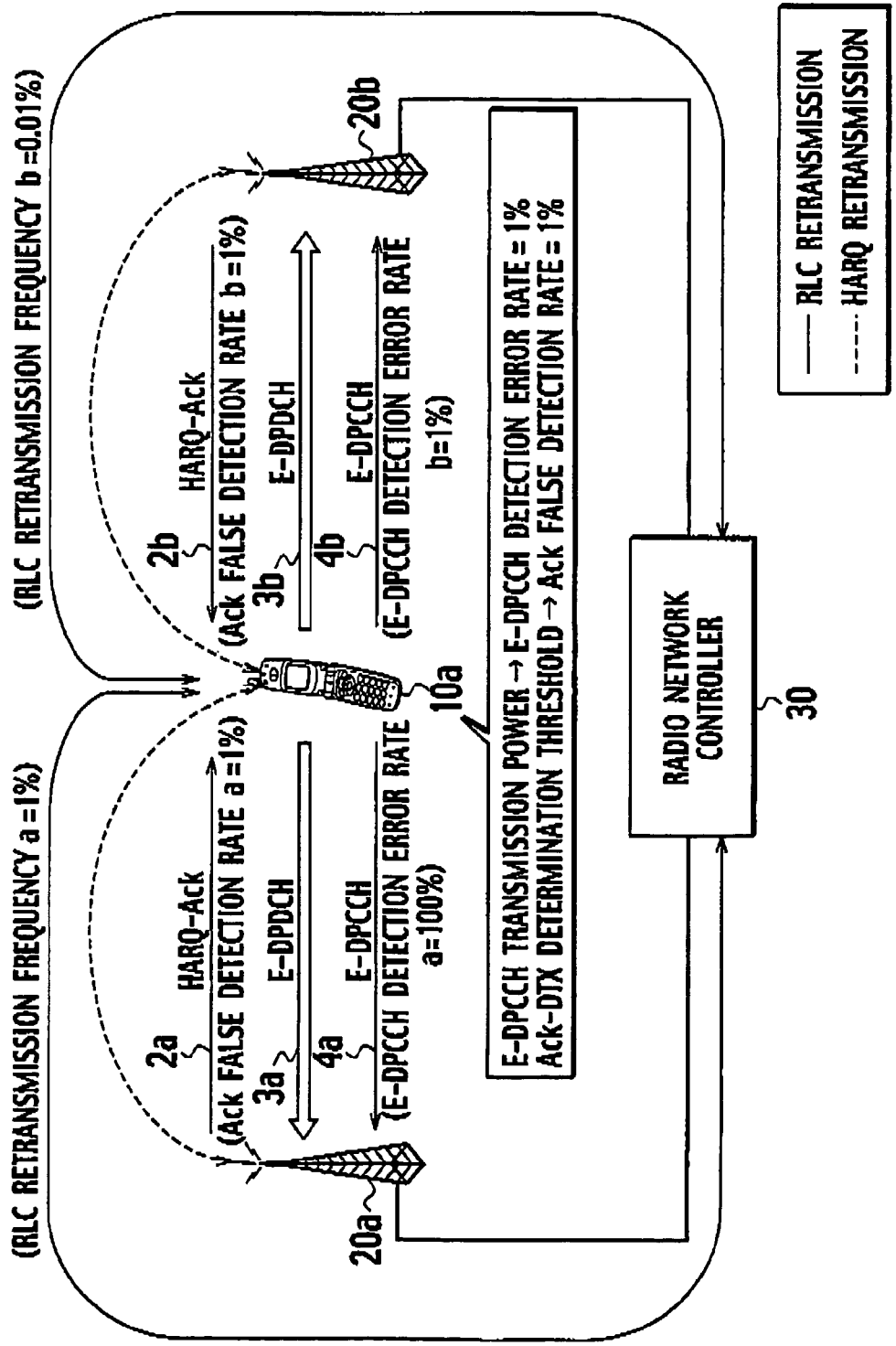
FIG. 3 is a diagram showing a state in that RLC retransmission is increased, when a mobile station is connecting a plurality of radio base stations.
Figure 4:
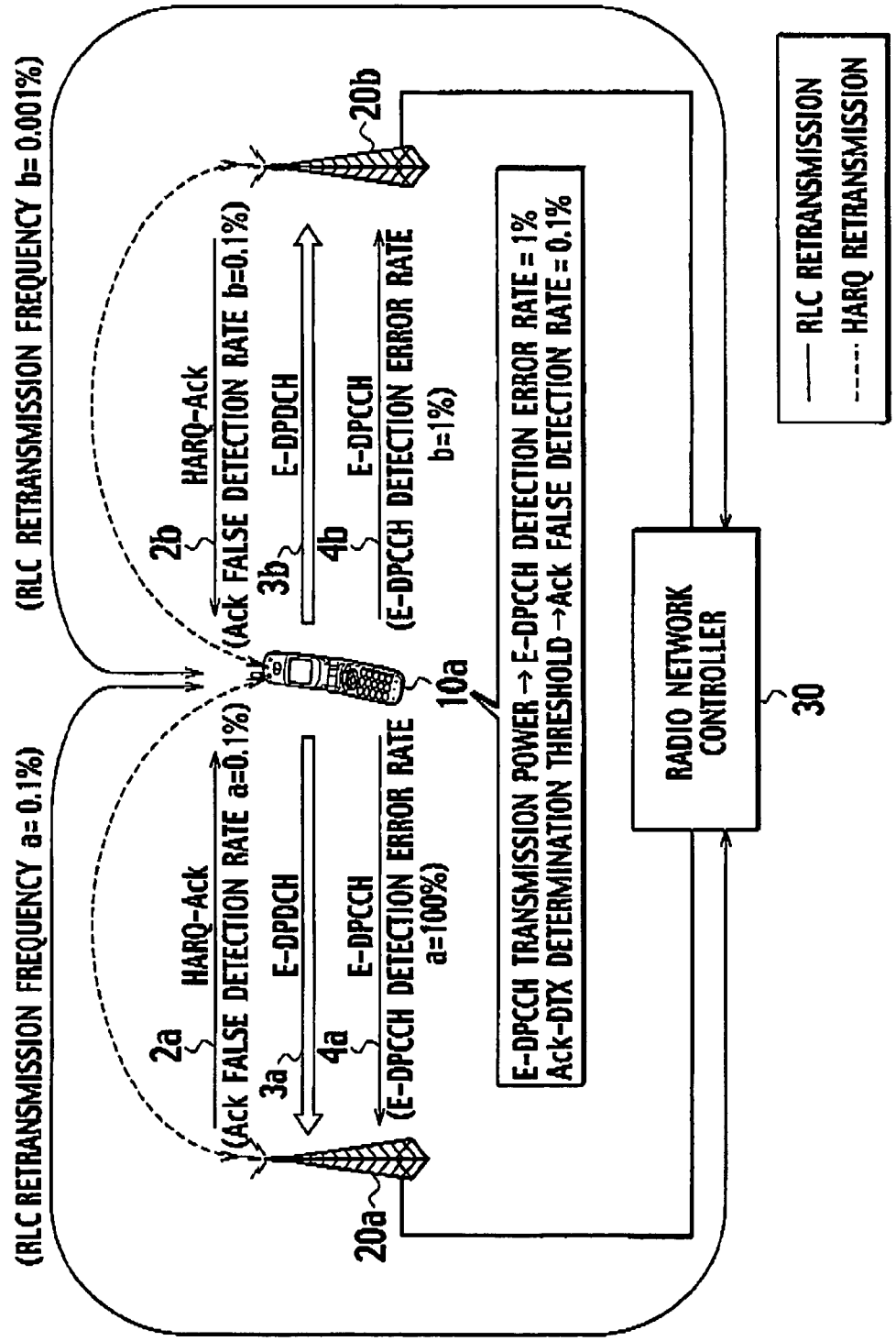
FIG. 4 is a diagram showing a state of connecting to a plurality of radio base stations according to the embodiment of the present invention.

As shown in FIGS. 3 and 4, when the mobile station 10a connects to the radio base stations 20a and 20b (is in diversity handover), the RLC retransmission frequency at the mobile station 10a due to the "E-DPCCH detection error-Ack false detection" is the sum of the "RLC retransmission frequency a" due to the "E-DPCCH detection error-Ack false detection" occurring between the mobile station 10a and the radio base station 20a and the "RLC retransmission frequency b" due to the "E-DPCCH detection error-Ack false detection" occurring between the mobile station 10a and the radio base station 20b.

In other words, the RLC retransmission frequency at the mobile station 10a due to the "E-DPCCH detection error-Ack false detection" is the sum of the product of the "E-DPCCH detection error rate a" at the radio base station 20a and the "Ack false detection rate a" of the HARQ-Ack 2a at the mobile station 10a, and the product of the "E-DPCCH detection error rate b" at the radio base station 20b and the "Ack false detection rate b" of the HARQ-Ack 2b at the mobile station 10a ("E-DPCCH detection error rate a"×"Ack false detection rate a"+"E-DPCCH detection error rate b"×"Ack false detection rate b").

During diversity handover, the mobile station 10a controls transmission power so that necessary power reaches the radio base station 20b of the best uplink radio link quality.

Consequently, at the radio base station 20a of the uplink radio link quality lower than that of the radio base station 20b, the "E-DPCCH detection error rate a" is deteriorated.

Figure 2:
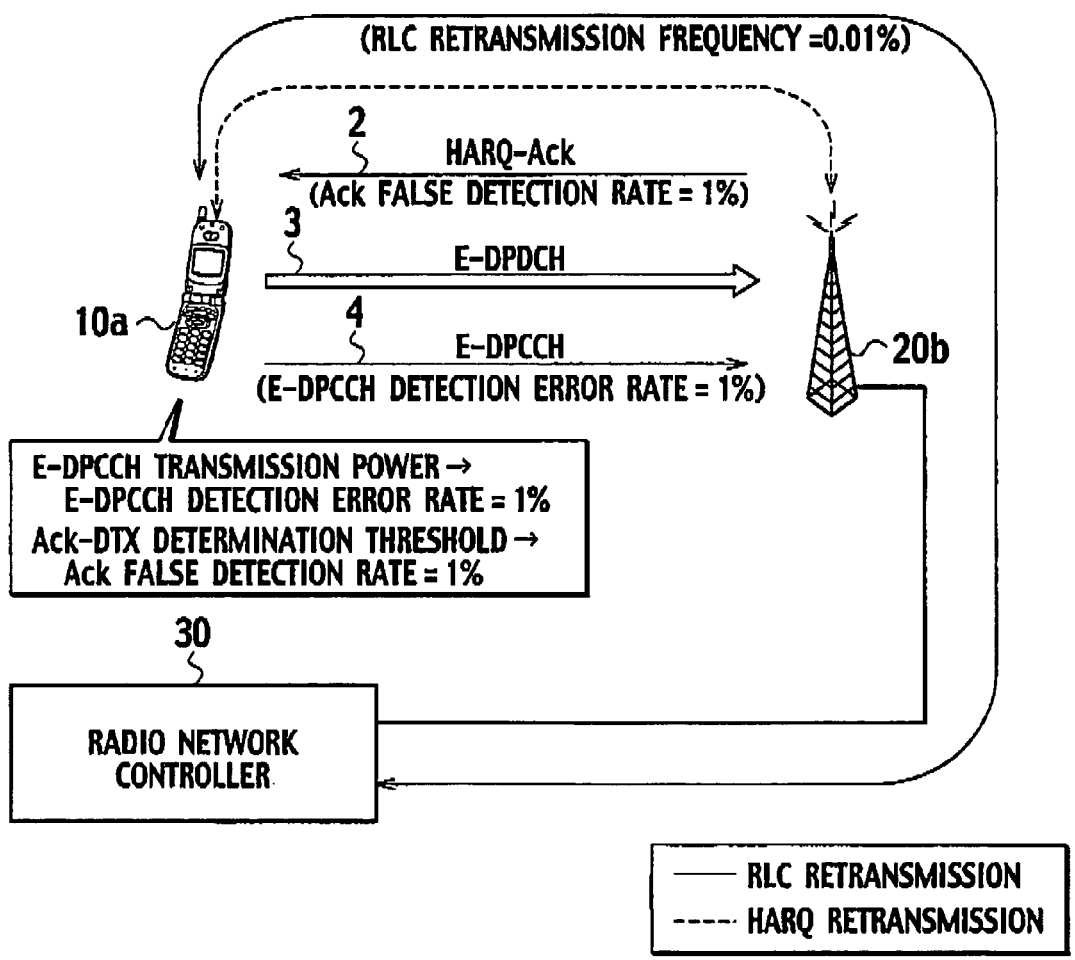
FIGS. 2 is a diagram showing a state of connecting to one radio base station according to the embodiment of the present invention.

Accordingly, when the mobile station 10a sets transmission power of the E-DPCCH so that the E-DPCCH detection error rate is 1% as in the case of FIG. 2 where it connects only to the radio base station 20b, for example, the "E-DPCCH detection error rate b" at the radio base station 20b is 1%, while the "E-DPCCH detection error rate a" at the radio base station 20a is worse than 1%.

Depending on the degree of deterioration of the uplink radio link quality at the radio base station 20a, the "E-DPCCH detection error rate a" may become 100%.

The Ack false detection is erroneous determination of "Ack" when the HARQ-Ack is in DTX, that is, erroneous determination that there is an acknowledgement signal when there is no acknowledgement signal.

By this nature, the Ack false detection rate is determined by the Ack-DTX determination threshold without depending on the uplink radio link quality.

Therefore, when the mobile station 10a sets the Ack-DTX determination threshold so that the Ack false detection rate is 1%, as in the case of FIG. 2 where it connects only to the radio base station 20b, for example, the "Ack false detection rate a" at the mobile station 10a for acknowledgement signals from the radio base station 20a and the "Ack false detection rate b" at the mobile station 10a for acknowledgement signals from the radio base station 20b are both 1%.

As described above, when the same setting as in the case of FIG. 2 where a connection is established with the radio base station 20b is also used in the case where connections are established with the radio base stations 20a and 20b, the "RLC retransmission frequency b" with the radio base station 20b of a good uplink radio link quality is kept at 0.01%, while the "RLC retransmission frequency a" with the radio base station 20a of a poor uplink radio link quality is increased to 1%, as shown in FIG. 3.

Consequently, the RLC retransmission frequency at the mobile station 10a due to the "E-DPCCH detection error-Ack false detection" reaches 1.01%.

That is, the RLC retransmission frequency when the mobile station 10a performing diversity handover uses the E-DCHs 1 is increased by the deterioration of the "E-DPCCH detection error rate a" at the radio base station 20a of the poor uplink radio link quality.

Therefore, the mobile station 10a sets and changes a threshold used for determining the presence or absence of an acknowledgement signal of user data, the "Ack-DTX determination threshold", according to the number of radio base stations to which the mobile station 10a connects.

For example, when the mobile station 10a is connected only to the radio base station 20b (in no diversity handover) as shown in FIG. 2, the mobile station 10a sets the Ack-DTX determination threshold so that the Ack false detection rate is 1%, thereby keeping the RLC retransmission frequency at 0.01%.

In contrast, when the mobile station 10a is connected to the radio base stations 20a and 20b (in diversity handover), the mobile station 10a sets the Ack-DTX determination threshold so that the Ack false detection rate is. 0.1% as shown in FIG. 4.

Accordingly, even when the "E-DPCCH detection error rate a" at the radio base station 20a of the poor uplink radio link quality is deteriorated to 100%, the "RLC retransmission frequency a" between the mobile station 10a and the radio base station 20a can be reduced to 0.1%.

Consequently, the RLC retransmission frequency at the mobile station 10a due to the "E-OPCCH detection error-Ack false detection" can be reduced to 0.101%, which is much smaller than that in the case of FIG. 3.

Here, if the mobile station 10a connected only to the radio base station 20b (in no diversity handover) as shown in FIG. 2 also sets the Ack-DTX determination threshold so that the Ack false detection rate is 0.1% as when the mobile station 10a is connected to the radio base stations 20a and 20b (in diversity handover), the RLC retransmission frequency becomes 0.001%, which is of somewhat excessive quality.

The Ack false detection rate is in a tradeoff relationship with the rate of occurrence of the "Ack detection error" that a transmitting end erroneously determines that Ack transmitted from a receiving end has not been transmitted, that is, has been in DTX (hereinafter referred to as the "Ack detection error rate").

Specifically, setting the Ack-DTX threshold so that the Ack false detection rate is always lower may lead to an increase in the rate of the Ack detection error that the mobile station 10a erroneously determines that the radio base station 20b is determining DTX, although Ack has been transmitted.

With the increase in the Ack detection error, even when the radio base station 20b properly receives a TB by the E-DPDCH 3, the mobile station 10a cannot recognize it, and performs useless the HARQ retransmission.

This may leads to deterioration in uplink radio transmission efficiency. To prevent the useless HARQ retransmission, the radio base station 20b needs to set Ack transmission power higher.

Therefore, if the Ack false detection rate is always set at a lower value, it is necessary to always increase Ack transmission power. Consequently, downlink radio resources may be excessively consumed, leading to deterioration in downlink radio transmission efficiency.

For the above, it is preferable for the mobile station 10a to set the Ack-DTX determination threshold so that the Ack false detection rate when the mobile station 10a connects to a plurality of radio base stations is lower than the Ack false detection rate when the mobile station 10a connects to one radio base station, as shown in FIGS. 2 and 4.

With this, the Ack false detection rate when the mobile station 10a is connected to the radio base stations 20a and 20b (in diversity handover) can be held lower than that when it is connected only to the radio base station 20b.

Consequently, as shown in FIG. 4, frequent occurrence of the RLC retransmission can be prevented when the mobile station 10a is connected to the radio base stations 20a and 20b (in diversity handover).

In addition, setting the Ack-DTX determination threshold so as to lower the Ack false detection rate only when the mobile station 10a is connected to the radio base stations 20a and 20b (in diversity handover) can limit a period in which the Ack transmission power is set high to prevent useless the HARQ retransmission associated with the Ack detection error rate, to a period of diversity handover.

Consequently, excessive consumption of downlink radio resources can be prevented to also improve downlink radio transmission efficiency.

The RLC retransmission frequency due to the "E-DPCCH detection error-Ack false detection" is the product of the E-DPCCH detection error rate and the Ack false detection rate. The E-DPCCH detection error rate depends on the transmission power of the E-OPCCH.

Therefore, the mobile station 10a may set the Ack-DTX determination threshold based on the transmission power of the radio physical control channel, E-DPCCH, in addition to the number of radio base stations to which it connects.

Accordingly, the mobile station 10a can prevent the RLC retransmission more adequately by taking the transmission power of the E-DPCCH, which affects the occurrence of the RLC retransmission, into account.

Specifically, the mobile station 10a can set the Ack-DTX determination threshold, based on the transmission power of the E-DPCCH, to acquire a desired RLC retransmission frequency.

For example, when the transmission power of the E-DPCCH is low and the E-DPCCH detection error rate is high, the mobile station 10a can set the Ack-DTX determination threshold so that the Ack false detection rate becomes low, to acquire a desired RLC retransmission frequency.

Next, the configuration of the mobile stations 10a and 10b, which perform transmission and reception of user data and retransmission control as described above, will be described.

Figure 5:
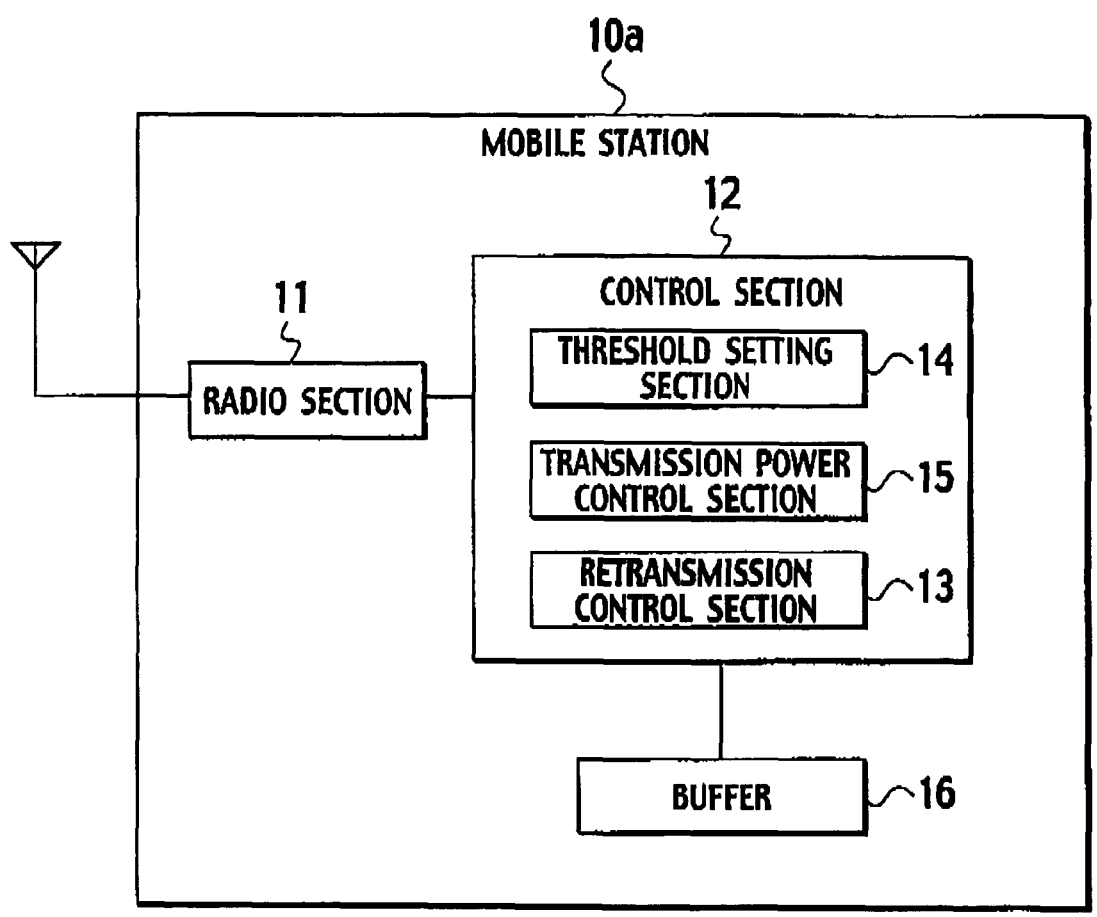
FIG. 5 is a block diagram showing the configuration of a mobile station according to the embodiment of the present invention.

As shown in FIG. 5, the mobile station 10a includes a radio section 11, a control section 12, and a buffer 16. The mobile station 10b has the same configuration as the mobile station 10a.

The radio section 11 is configured to perform radio communication with the radio base stations 20a and 20b, according to control by the control section 12.

The radio section 11 is configured to acquire data transmitted from the control section 12 for transmission to the radio base stations 20a and 20b.

The radio section 11 is configured to receive data from the radio base stations 20a and 20b, and to provide the received data to the control section 12.

The control section 12 is configured to control the radio section 11, and to control radio communication with the radio base stations 20a and 20b.

Specifically, the control section 12 includes a retransmission control section 13, a threshold setting section 14, and a transmission power control section 15.

The control section 12 is configured to perform processing in the RLC sublayer, the MAC sublayer and the physical layer for the above-described RLC retransmission, HARQ retransmission, and transmission and reception of user data according to the EUL and the HSDPA, and so on.

The retransmission control section 13 is configured to perform retransmission control of user data in the physical layer and the MAC sublayer with the radio base stations 20a and 20b. Specifically, the retransmission control section 13 is configured to perform the HARQ retransmission.

Also, the retransmission control section 13 is configured to perform retransmission control of user data in the RLC sublayer also with the radio network controller 30. Specifically, the retransmission control section 13 is configured to perform the RLC retransmission.

The retransmission control section 13 is configured to perform retransmission control using the buffer 16. User data is stored in the buffer 16.

The threshold setting section 14 is configured to set a threshold used for determining the presence or absence of an acknowledgement signal of user data, according to the number of connected radio base stations.

Specifically, as shown in FIGS. 2 and 4, the threshold setting section 14 is configured to set and change the Ack-DTX determination threshold, a threshold used for determining the presence or absence of an acknowledgement signal (HARQ-Ack) of user data which the radio section 11 has transmitted, according to the number of radio base stations to which the mobile station 10a connects, that is, according to whether in diversity handover or not.

The threshold setting section 14 can detect the number of radio base stations to which the radio section 11 connects, to set the Ack-DTX determination threshold.

The threshold setting section 14 is configured to input the set Ack-DTX determination threshold into the retransmission control section 13.

The retransmission control section 13 is configured to perform retransmission control, using the Ack-DTX determination threshold acquired from the threshold setting section 14.

It is preferable for the threshold setting section 14 to set the Ack-DTX determination threshold so that the Ack false detection rate when connections are established with a plurality of radio base stations is lower than the Ack false detection rate when a connection is established with one radio base station, as shown in FIGS. 2 and 4.

Also, the threshold setting section 14 may set the Ack-DTX determination threshold, based on the transmission power of a radio physical control channel, E-DPCCH, or the like, in addition to the number of connected radio base stations.

In this case, the threshold setting section 14 is configured to acquire the transmission power of E-DPCCH or the like from the transmission power control section 15.

The transmission power control section 15 is configured to control transmission power used for data transmission by the radio section 11.

Also, the transmission power control section 15 is configured to set the E-DPCCH detection error rate.

Then, the transmission power control section 15 is configured to control the transmission power of E-DPCCH to realize the set E-DPCCH detection error rate.

According to the mobile communication system 100, the mobile stations 10a and 10b and the mobile communication method according to this embodiment, retransmission control of user data can be performed in the physical layer and the MAC sublayer between the mobile stations 10a and 10b and the radio base stations 20a and 20b, and thus high-speed retransmission control becomes possible.

Also, the mobile stations 10a and 10b can change the Ack-DTX determination threshold, a threshold used for determining the presence or absence of an acknowledgement signal, according to the number of connected radio base stations.

Consequently, when the mobile stations 10a and 10b are in diversity handover (soft handover), frequent occurrence of the RLC retransmission, which is lower in speed than the HARQ retransmission, can be prevented.

Accordingly, the mobile stations 10a and 10b can reduce delay caused by retransmission, improving radio transmission efficiency.

More specifically, the mobile station 10a or 10b can make a threshold used for determining the presence or absence of an acknowledgement signal transmitted from the radio base station 20a or 20b on uplink user data transmitted by the mobile station 10a or 10b when connecting to one radio base station, different from that when connecting to a plurality of radio base stations.

With this, erroneous determination that the mobile station 10a or 10b, when connecting to the radio base stations 20a and 20b, determine that there is an acknowledgement signal, although there is not, can be reduced as compared with when it connects to one radio base station.

Consequently, when the mobile station 10a or 10b connect to the radio base stations 20a and 20b, frequent occurrence of the RLC retransmission can be prevented.

Accordingly, the mobile communication system 100 can employ the HARQ retransmission, high-speed retransmission control, while avoiding the RLC retransmission, low-speed retransmission control, as much as possible.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile station comprising:
   a retransmission control section configured to perform retransmission control of user data in a physical layer and a MAC sublayer with one or more radio base stations; and
   a threshold setting section configured to set a threshold used for determining presence or absence of an acknowledgement signal of the user data, according to the number of the radio base stations to which the mobile station connects, and wherein the threshold setting section is configured to set the threshold so that a probability of a DTX appearing as an ACK when the mobile station connects to a plurality of radio base stations is lower than the probability of the DTX appearing as an ACK when the mobile station connects to one radio station,
   wherein the DTX appearing as an ACK is a situation where a transmitting apparatus detects the acknowledgement signal even if a receiving apparatus does not transmit the acknowledgement signal when the receiving apparatus is not aware of a data transmission from the transmitting apparatus.

2. The mobile station as set forth in claim 1, wherein the threshold setting section is configured to set the threshold, based on transmission power of a radio physical control channel.

3. The mobile station as set forth in claim 1, wherein the retransmission control section is configured to perform the retransmission control by a hybrid automatic repeat request scheme.

4. The mobile station as set forth in claim 1, wherein the user data is transmitted by enhanced uplink.

5. A mobile communication system in which user data is transmitted and received between a mobile station and one or more radio base stations, comprising:
   the mobile station comprising:
   a retransmission control section configured to perform retransmission control of the user data in a physical layer and a MAC sublayer with the radio base stations; and
   a threshold setting section configured to set a threshold used for determining presence or absence of an acknowledgement signal of the user data, according to the number of the radio base stations to which the mobile station connects, and wherein the threshold setting section is configured to set the threshold so that a probability of a DTX appearing as an ACK when the mobile station connects to a plurality of radio base stations is lower than the probability of the DTX appearing as an ACK when the mobile station connects to one radio station, wherein the DTX appearing as an ACK is a situation where a transmitting apparatus detects the acknowledgement signal even if a receiving apparatus does not transmit the acknowledgement signal when the receiving apparatus is not aware of a data transmission from the transmitting apparatus.

6. A mobile communication method comprising:
   performing retransmission control of user data in a physical layer and a MAC sublayer between a mobile station and one or more radio base stations; and
   setting a threshold used for determining presence or absence of an acknowledgement signal of the user data, according to the number of the radio base stations to which the mobile station connects, and wherein the threshold setting section is configured to set the threshold so that a probability of a DTX appearing as an ACK when the mobile station connects to a plurality of radio base stations is lower than the probability of the DTX appearing as an ACK when the mobile station connects to one radio station, wherein the DTX appearing as an ACK is a situation where a transmitting apparatus detects the acknowledgement signal even if a receiving apparatus does not transmit the acknowledgement signal when the receiving apparatus is not aware of a data transmission from the transmitting apparatus.

* * * * *